(12) United States Patent
Manlove et al.

(10) Patent No.: US 10,013,003 B2
(45) Date of Patent: Jul. 3, 2018

(54) FEED FORWARD CURRENT MODE SWITCHING REGULATOR WITH IMPROVED TRANSIENT RESPONSE

(71) Applicant: Linear Technology Corporation, Milpitas, CA (US)

(72) Inventors: Gregory Manlove, Colorado Springs, CO (US); Yi Ding Gu, Pleasanton, CA (US); Jian Li, San Jose, CA (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 567 days.

(21) Appl. No.: 13/764,045

(22) Filed: Feb. 11, 2013

(65) Prior Publication Data

US 2014/0139198 A1    May 22, 2014

Related U.S. Application Data

(60) Provisional application No. 61/727,408, filed on Nov. 16, 2012.

(51) Int. Cl.
*H02M 3/156* (2006.01)
*G05F 1/10* (2006.01)

(52) U.S. Cl.
CPC .............. *G05F 1/10* (2013.01); *H02M 3/156* (2013.01)

(58) Field of Classification Search
CPC ...... H02M 3/137; H02M 3/139; H02M 3/142; H02M 3/155; H02M 3/156; H02M 3/1563; H02M 3/157; H02M 3/158; H02M 2001/0009; H02M 2001/0012; H02M 2001/0016; H02M 2001/0019; H02M 2001/0025; H02M 2001/0032;
(Continued)

(56) References Cited

U.S. PATENT DOCUMENTS 6,646,426 B2 * 11/2003 Terashi ..................... 323/285
7,441,137 B1 * 10/2008 Mimberg ................... 713/340
(Continued)

FOREIGN PATENT DOCUMENTS

CN    101800474 A    8/2010

OTHER PUBLICATIONS

PCT/US2013/062357 International Search Report and Written Opinion, dated Jul. 31, 2014, 10 pages.

*Primary Examiner* — Timothy J Dole
*Assistant Examiner* — Carlos Rivera-Perez
(74) *Attorney, Agent, or Firm* — Patent Law Group LLP; Brian D. Ogonowsky

(57) ABSTRACT

A switching regulator circuit incorporates an offset circuit, connected in a control loop of the regulator circuit, that, in response to a signal indicating an imminent load current step, adjusts a duty cycle of a power switch for the current step prior to the regulator circuit responding to a change in output voltage due to the current step. In one embodiment, a load controller issues a digital signal shortly before a load current step. The digital signal is decoded and converted to an analog offset signal in a feedback control loop of the regulator to immediately adjust a duty cycle of the switch irrespective of the output voltage level. By proper timing of the offset, output voltage ripple is greatly reduced. The current offset may also be used to rapidly change the output voltage in response to an external signal requesting a voltage step.

19 Claims, 10 Drawing Sheets

(58) Field of Classification Search
CPC .. H02M 2001/0035; H02M 1/32; H02M 1/36; H02M 2003/1566; G05F 1/46; G05F 1/462; G05F 1/468; G05F 1/56; G05F 1/562; G05F 1/575; G05F 1/565; G05F 1/618
USPC ........ 323/222–226, 271–277, 280, 282–290, 323/351; 713/300–340; 700/297, 298
See application file for complete search history.

(56) References Cited

U.S. PATENT DOCUMENTS

| | | | |
|---|---|---|---|
| 7,671,575 B1* | 3/2010 | Suzuki et al. | 323/285 |
| 7,863,875 B1* | 1/2011 | Guo et al. | 323/275 |
| 2002/0135345 A1 | 9/2002 | Terashi | |
| 2007/0078568 A1* | 4/2007 | Donaldson et al. | 700/298 |
| 2008/0150500 A1* | 6/2008 | Gurcan | 323/271 |
| 2008/0164859 A1 | 7/2008 | Peng et al. | |
| 2008/0258701 A1 | 10/2008 | Liu et al. | |
| 2010/0001704 A1* | 1/2010 | Williams | 323/283 |
| 2010/0308654 A1 | 12/2010 | Chen | |
| 2010/0308784 A1 | 12/2010 | Scoones et al. | |
| 2010/0320992 A1 | 12/2010 | Dearn | |
| 2011/0018513 A1* | 1/2011 | Noda | 323/282 |
| 2011/0101937 A1 | 5/2011 | Dobkin et al. | |
| 2014/0232190 A1 | 8/2014 | Chen | |

* cited by examiner

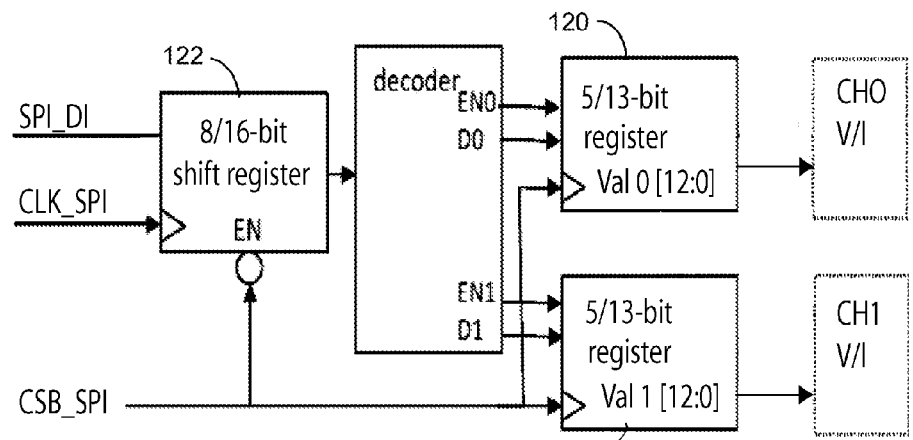
FIG. 16
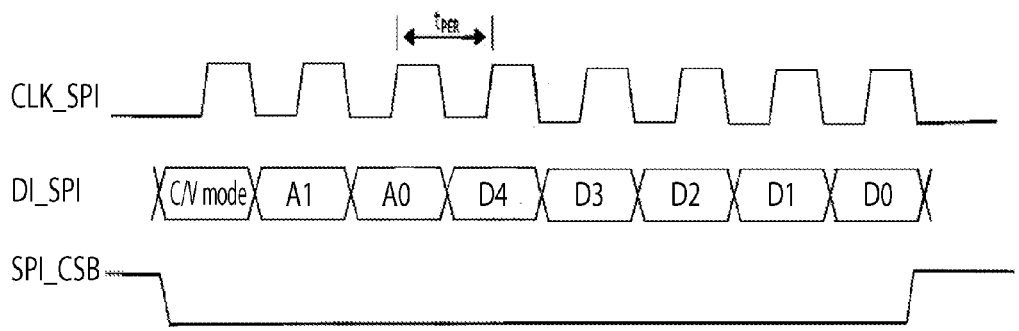
FIG. 17
| A1 | A0 | D4,D3,D2,D1,D0 Offset Data |
|----|----|----|
| 0 | 0 | CH0 Select |
| 0 | 1 | Ch1 Select |
| 1 | X | CH0 and CH1 Select |
FIG. 18

FEED FORWARD CURRENT MODE SWITCHING REGULATOR WITH IMPROVED TRANSIENT RESPONSE

CROSS-REFERENCE TO RELATED APPLICATIONS

This application is based on and claims priority from U.S. provisional patent application Ser. No. 61/727,408, filed on Nov. 16, 2012, entitled, Switching Regulator With Improved Transient Response, by Greg Manlove et al., assigned to the present assignee and incorporated herein by reference.

FIELD OF THE INVENTION

This invention relates to switching regulators and, in particular, to a technique to improve the output voltage response to either a load transient or an adjustment in the output voltage.

BACKGROUND

Switching regulators typically switch at frequencies from 100 kHz-5 MHz. One common type of switching regulator is a current mode (CM) regulator. In a CM regulator there is a fast current loop that detects a ramping current through a power switch or through the inductor and a much slower voltage loop that detects the output voltage. A large capacitor connected to the output of the regulator smooths the output voltage.

When there is a load current transient, such as when the load goes into or comes out of a standby mode, the load current may instantaneously change. If, for example, the load comes out of a standby mode, the instantaneous increase in current will draw charge from the output capacitor and cause the output voltage to temporarily droop until the next switching cycle. During the next switching cycle, the regulator detects the lowered output voltage and increases the duty cycle of the power switch to compensate for the increased load current. Correcting for the current transient is a function of the voltage feedback loop bandwidth and thus takes many clock cycles, resulting in output voltage ripple.

Such ripple may cause the regulated voltage to transition out of the desired operating range. What is needed is a technique for reducing output voltage ripple in regulators due to load current transients without significantly increasing the load capacitance.

Additionally, some applications require the switching regulator to make a step change in its regulated voltage level in response to an external command signal. Once the externally generated command signal is received, a change is made to the feedback voltage or reference voltage in the relatively slow voltage loop to cause the regulator to output the new voltage. In a typical regulator, the regulator adjusts its duty cycle to match the feedback voltage to the reference voltage applied to an error amplifier. Changing the feedback voltage (to change the regulated voltage) may be by changing the resistor ratio in a resistor divider connected between the output voltage and the input into the error amplifier. However, changing the reference voltage into the error amplifier is deemed to be a simpler way to change the regulated output voltage. Other ways to change the feedback voltage may be used; however, all such changes are performed in the relatively slow voltage loop. Due to the slow reaction time of the voltage loop, there is a delay, such as on the order of 30 μS or more for only a 0.1 volt step, before the regulator outputs the new regulated voltage. The delay occurs whether the voltage step is in the positive or negative direction. In an optimal design, the voltage loop bandwidth cannot be increased without adversely impacting the phase margin.

What is needed is a technique for reducing the delay before the regulator outputs a target regulated voltage in response to an external command signal for changing the regulated output voltage.

SUMMARY

A novel CM regulator is disclosed that receives a signal identifying an imminent load current step (or any other change in load current) and, in response, offsets a signal in a control loop of the regulator to increase or decrease the duty cycle of the power switch at approximately the time of the load current step so that the regulator supplies the required current to the load at the time of the load current step, with no requirement for the voltage loop to respond, resulting in a substantial reduction in output voltage ripple. The offset occurs substantially immediately so the compensation occurs before the next clock cycle. Accordingly, the compensation occurs prior to any detection of a deviation in the output voltage due to the current step. The amount of reduction in ripple is significant since, typically, the voltage loop is slow to respond to the current step due to the finite bandwidth of the loop required to assure optimal stability.

In one embodiment of the invention, a load controller generates a digital signal corresponding to an anticipated load current step (up or down) shortly before the load current step. The signal may designate the magnitude of the current step to any resolution. The digital signal may be sent within 0.5 uS of the load current step and, preferably, within the clock period of the CM regulator preceding the current step. A digital-to-analog converter (DAC) converts the digital signal to a scaled analog offset signal corresponding to the necessary current feedback offset in the regulator. The offset voltage (either positive or negative) is summed with the fast current loop signal to offset the current feedback signal that normally identifies the instantaneous current through the power stage. Since the duty cycle of the power switch is determined, in part, by the detected current feedback signal, the offset creates a false feedback condition that assumes that the current step is already occurring. Thus, the regulator instantaneously reacts to the offset condition to generate more or less current during the switching cycle than would have normally been generated. Therefore, when the load current changes, the regulator has already reacted to supply the required current to the load, resulting in reduced output voltage ripple.

The offset may even occur immediately after the current step (e.g., within 0.5uS after) and still reduce ripple as long as the offset causes the duty cycle adjustment prior to the regulator reacting to a change in the output voltage.

In one embodiment, in the event that the power switch has already been disabled during a clock cycle, such as by the resetting of a flip-flop, at the time of the offset signal, the offset circuitry provides a set signal to the flip-flop to re-enable the power switch for that clock cycle. Therefore, the power switch does not have to wait for the next clock cycle to supply added current to the load.

In one embodiment, the offset condition remains fixed for the length of the current step until the load controller transmits another digital code identifying an imminent load current step.

The offset may be applied to the current loop or to the voltage loop in certain regulator configurations. Any CM regulator may be easily modified to incorporate the change without affecting the regulator's operation during non-transient conditions. Voltage offsets can be applied to any regulator topology. The offset may be employed in any regulator where a comparator triggers based on a current signal.

This general technique may also be applied to responding to an external command signal for changing the output voltage of a current mode regulator. In addition to modifying the reference voltage or feedback voltage in the slow voltage loop to cause a new regulated output voltage to be generated, which may be done in a conventional way, a brief offset is applied in the fast current loop to quickly step the output voltage to the target voltage well prior to the time that the voltage loop would have achieved the target voltage in response to the modified feedback voltage. In an example of an external command signal commanding the regulator to step up its output voltage from 1.8 volts to 1.9 volts, a current offset is introduced into the fast current loop, such as for 8uS, to instantaneously supply extra current to the output capacitor for a duration needed to increase the output voltage by 0.1 volt. The required extra current and duration to achieve the voltage step is determined by the equation $I=C\Delta V/\Delta T$. Multiple switching cycles may be needed to supply the required current. Since the power switch current ramps up at a known rate and the capacitance is known, the required duration of the offset (which increases the on-time of the power switch) may be easily calculated and programmed into a decoder to supply the extra current to quickly increase the output voltage. The offset times programmed into the decoder correspond to the required voltage step needed to achieve the output voltage designated by the digital external command signal. This same technique is also applied when the external command signal specifies a downward step of the output voltage, where an opposite offset is applied in the current loop to quickly decrease the on-time of the power switch for a brief period. Once the output capacitor has been charged to the desired output voltage, and the current offset has been removed, the regulator operates normally, where the voltage loop controls the output voltage using the modified reference voltage or feedback voltage. A 3×improvement in the voltage transient response has been achieved using this technique.

Other embodiments are described.

BRIEF DESCRIPTIONS OF DRAWINGS

FIG. 4 illustrates a simulation of signals generated in a prior art regulator in response to a load current step.

FIG. 5 is a close up of the output voltage line in FIG. 4

FIG. 6 illustrates a simulation of signals generated in a regulator, in accordance with one embodiment of the invention, in response to a load current step.

FIG. 7 is a close up of the output voltage line in FIG. 6 showing a greatly reduced output voltage ripple.

FIG. 8 illustrates a simulation of signals generated in a regulator, in accordance with one embodiment of the invention, where the offset is generated without a load current step.

FIG. 9 illustrates the effects on output voltage ripple where the offset signal is applied too late due to the clock cycle delay in the regulator.

FIG. 10 illustrates the effects on output voltage ripple where the timing of the offset signal is better controlled to occur at the time of the load current step.

FIG. 11 illustrates a 4-phase transient response to a load current step in a conventional CM regulator, resulting in a large output voltage ripple.

FIG. 12 illustrates the transient response of a 4-phase CM regulator, in accordance with the present invention, responding to a 40 A load current step with variable time delays between the load transient and the current comparator offset adjustment.

FIG. 16 illustrates the digital control portion of an offset circuit in accordance with one embodiment of the invention.

FIG. 17 illustrates the data and clock signals for the circuit of FIG. 15.

FIG. 18 defines the digital bits in one embodiment.

DETAILED DESCRIPTION

The conventional approach to reducing output voltage ripple from current transients is to increase the size of the output capacitor (COUT) and reduce the capacitor ESR. Both techniques are costly and require significant board space. The new approach will be important in many applications.

Figure 1:
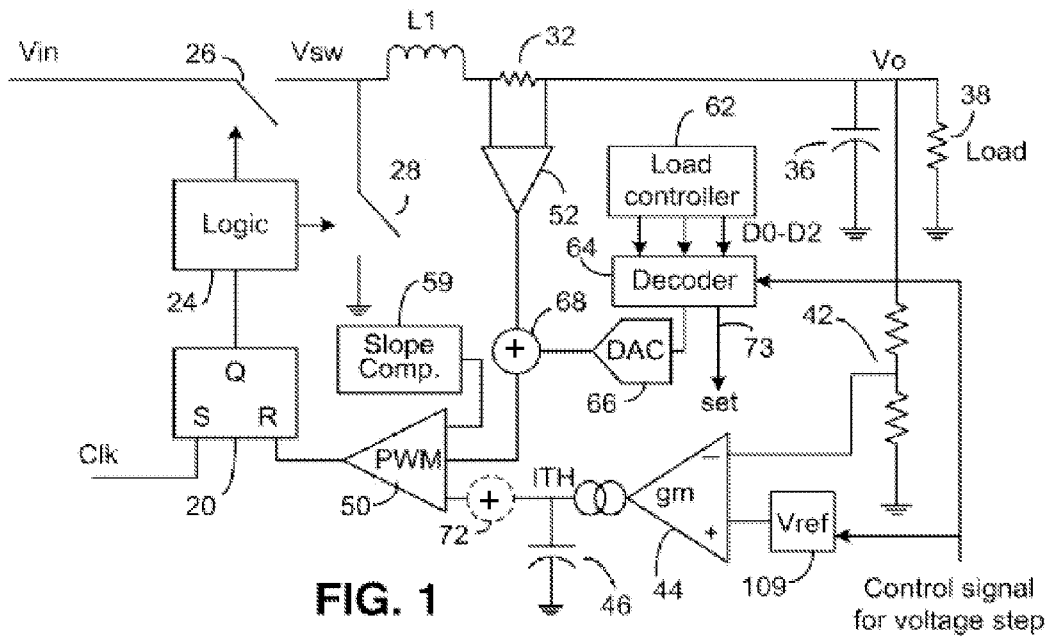
FIG. 1 illustrates a conventional current mode (CM) switching regulator but augmented with the offset circuitry of the present invention.

FIG. 1 illustrates one type of prior art current mode (CM) DC/DC switching power supply, also known as a current mode DC/DC converter, but augmented with an offset feature in a control loop, in accordance with one embodiment of the invention. Many other converter configurations can also benefit from the present invention. The type of converter shown in FIG. 1 is a peak current mode converter.

The normal operation of the converter, not including the operation of the offset feature, is conventional and is as follows.

A clock (Clk) signal is applied to the set input of an RS flip flop 20.

The setting of the RS flip flop 20 generates a high signal at its Q output. A logic circuit 24, in response, turns the transistor switch 26 (the power switch) on and turns the synchronous rectifier switch 28 off. Both switches may be MOSFETs or other transistors. A diode may replace the synchronous rectifier switch 28. The logic circuit 24 ensures that there is no cross-conduction of switches 26 and 28. The input voltage Vin applied to an inductor L1 through the switch 26 causes a ramping current to flow through the inductor L1, and this current flows through a low value sense resistor 32. The ramping current is filtered by an output capacitor 36 and supplies current to the load 38. The output capacitor 36 is relatively large to smooth out ripple.

The output voltage Vo is applied to a voltage divider 42, and the divided voltage is applied to the negative input of a transconductance error amplifier 44. A reference voltage Vref is applied to the positive input of the amplifier 44. The output current of the amplifier 44 corresponds to the difference between the actual output voltage Vo and the desired output voltage. The voltage across a capacitor 46 at the output of the amplifier 44 is adjusted up or down based on the positive or negative current output of the amplifier 44. Such a voltage is referred to as a control voltage Vc or a current threshold ITH voltage. The voltage ITH at the capacitor 46, in conjunction with the inductor ramping current, sets the duty cycle of the switch 26, and the level of the voltage ITH is that needed to equalize the inputs into the amplifier 44.

The control voltage ITH is applied to a pulse width modulation (PWM) comparator 50 (also known as a current comparator). The ramping voltage across the sense resistor 32, when the switch 26 is on, is sensed by a differential amplifier 52, having a certain gain, and, when the output of the amplifier 52 exceeds the control voltage ITH, the PWM comparator 50 is triggered to output a reset signal to the RS flip flop 20. This turns the switch 26 off and turns the synchronous rectifier switch 28 on to discharge the inductor L1, causing a downward ramping current. In this way, the peak current through the inductor L1 for each cycle is regulated to provide the required average current to maintain a regulated output voltage Vo.

FIG. 1 also illustrates a conventional slope compensation circuit 59, as is well known for current mode power converters. At high duty cycles (typically greater than 50%), the slope compensation circuit 59 turns off the switch 26 before the inductor current ramp crosses the control voltage ITH to reduce sub-harmonic oscillations that may occur in the current loop at the high duty cycles. The effect of the slope compensation circuit 59 is unrelated to the present invention.

Instead of detecting the inductor current through a sense resistor, the current through the inductor L1 may be sensed by detecting the voltage drop across the switch 26 (e.g., a MOSFET) or by detecting the voltage at a capacitor (FIG. 2) in parallel with the inductor L1 that effectively emulates the current through the inductor L1.

The load 38 may be any device, such as a computer, which has varying current needs for proper operation. For example, the load 38 may have a low current standby mode when not in use. Upon the user pressing a button, for example, or after a period of time, the load 38 may come out of the sleep mode and draw much more current. Similarly, the load 38 may automatically go into sleep mode after a period of non-use and draw very little current. The load 38 may also be a motor or a display backlight, for example, and draw widely varying currents.

As discussed above, immediately after the load current changes, there is a ripple of the output voltage as the load current undergoes a step change. Upon a positive current step, charge is removed from the output capacitor, lowering the output voltage, and there is an extended period before the regulator can react to the lowered output voltage by increasing the duty cycle and supplying an average current equal to the increased load current. Conversely, when there is a negative current step, too much charge is supplied to the output capacitor, and the output voltage temporarily increases until the regulator can react to the increased output voltage. Such voltage transients may affect the operation of other circuitry on the power bus or may affect operation of the load 38.

In FIG. 1, the load 38 is controlled by a load controller 62. The load controller 62 may be any device that controls the load 38 to draw different currents, such as a CPU, a logic circuit, or even a switch controlled by the user. In the example of the load 38 coming out of a sleep mode, the load controller 62 generates a digital signal shortly before the load current step. In one embodiment, the digital signal is generated within 500 ns of the current step. The digital signal (e.g., D0-D2) is applied to a decoder 64 that processes the signal to provide the optimal offset for the regulator given the parameters of regulator and the current step information conveyed by the digital signal. The digital signal may be the same for any regulator, but the decoder 64 processes the digital signal differently for different regulators. In another embodiment, the digital signals are already customized for the particular regulator.

The digital output of the decoder 64 is converted to an analog voltage by a digital-to-analog converter (DAC) 66.

A voltage summer 68 adds the analog signal (which may be positive or negative) to the current sense signal output by the amplifier 52 to offset the current sense signal. In the case of a positive load current step, the offset lowers the current feedback signal into the PWM comparator 50 to keep the power switch 26 on longer than it would normally have been on (assuming the power switch is already on). In other words, the ramping of the current through the power switch 26 continues a longer time to supply excess charge to the output capacitor shortly before or simultaneously with the positive load current step. When the current step occurs, the increased current drawn by the load 38 is supplied by the additional charge being already supplied to the output capacitor. The offset may be fixed for the entire length of the current step. In another embodiment, the offset may taper off over a few clock cycles to smoothly transition into the regulator's normal operation to minimize output voltage ripple.

Before the end of the current step, or simultaneously with the end of the current step, the load controller issues another digital signal to cause the offset to be extinguished. This substantially immediately adjusts the duty cycle to account for the change in load current prior to the regulator reacting to any change in the output voltage, reducing the output voltage ripple.

In an alternative embodiment, the offset may be to the voltage feedback loop, as indicated by the summer 72 in dashed outline. In the example of a positive load current step, the offset would raise the control voltage applied the PWM comparator 50 to keep the power switch 26 on longer.

In the event of a negative load current step, the offsets would be the opposite to immediately reduce the peak current through the power switch 26 prior to or simultaneously with the negative current step.

The offset occurs independently of the clock Clk pulses so there is no delay in the compensation, and the compensation occurs prior to the regulator reacting to any output voltage change.

In the event that the power switch 26 has already been turned off during a clock cycle by the flip-flop 20 being reset, the decoder 64 or other circuit may generate a set signal 73 for the flip-flop 20 to turn the power switch 26 back on, thus providing two current pulses in a single clock cycle.

Figure 2:
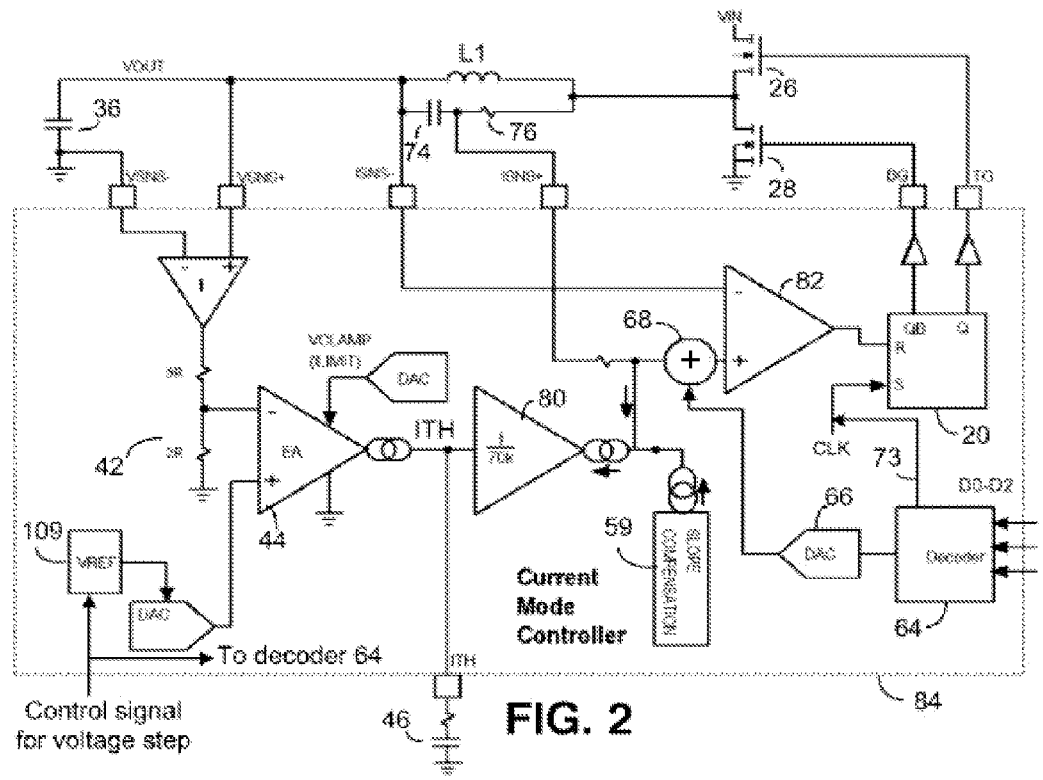
FIG. 2 illustrates another embodiment of a conventional CM switching regulator but augmented with the offset circuitry of the present invention.

FIG. 2 illustrates a different type of CM regulator that is augmented with the present invention.

In FIG. 2, instead of a series resistor to determine the instantaneous current through the power switch, a capacitor 74 and resistor 76 are connected in parallel with the inductor L1, and the voltage across the capacitor 74 emulates the current through the inductor L1. The voltage is offset by the summer 68, discussed with respect to FIG. 1, to compensate for load current steps. A buffer 80 scales and buffers the ITH signal at the output of the error amplifier 44, and, in normal operation, the buffered output adjusts the time that the rising ISNS+ voltage crosses the ISNS− voltage to trigger the comparator 82 to reset the flip-flop 20. The comparator 82 may be referred to as a current comparator. The summer 68 adds to or subtracts from the ISNS+ signal to delay or accelerate the resetting of the flip-flop 20 to compensate for the anticipated load current step, as discussed with respect to FIG. 1. The remainder of the circuitry of FIG. 2 may be similar to FIG. 1.

The regulator control circuitry within the dashed outline 84 will typically be formed as a single integrated circuit.

In another embodiment, a separate decoder 64 is eliminated and the load controller 62 (FIG. 1) generates digital signals D0-D2 that are already customized for the particular regulator used. However, using a separate decoder 64 customized for the particular regulator characteristics enables the digital signals D0-D2 to be generic for a variety of regulators augmented with the inventive circuitry and increases functionality. Alternatively, the signals from the load controller 62 may be already in analog form and appropriately scaled so that a separate DAC 66 and decoder 64 are not needed.

There may be any number of bits in the digital signal, depending on the desired compensation resolution and other factors. The digital signals may be in parallel or serial. Multiple regulators or channels may be controlled with the same set of digital signals.

The digital signal for the offset need not be generated for all load current transients but only for large current steps that may create unacceptable voltage ripples.

FIGS. 1 and 2 illustrate just two of the many types of regulators that may be augmented with the summer 68, DAC 66, and decoder 64 to reduce the output voltage transient due to a load current step.

Figure 3:
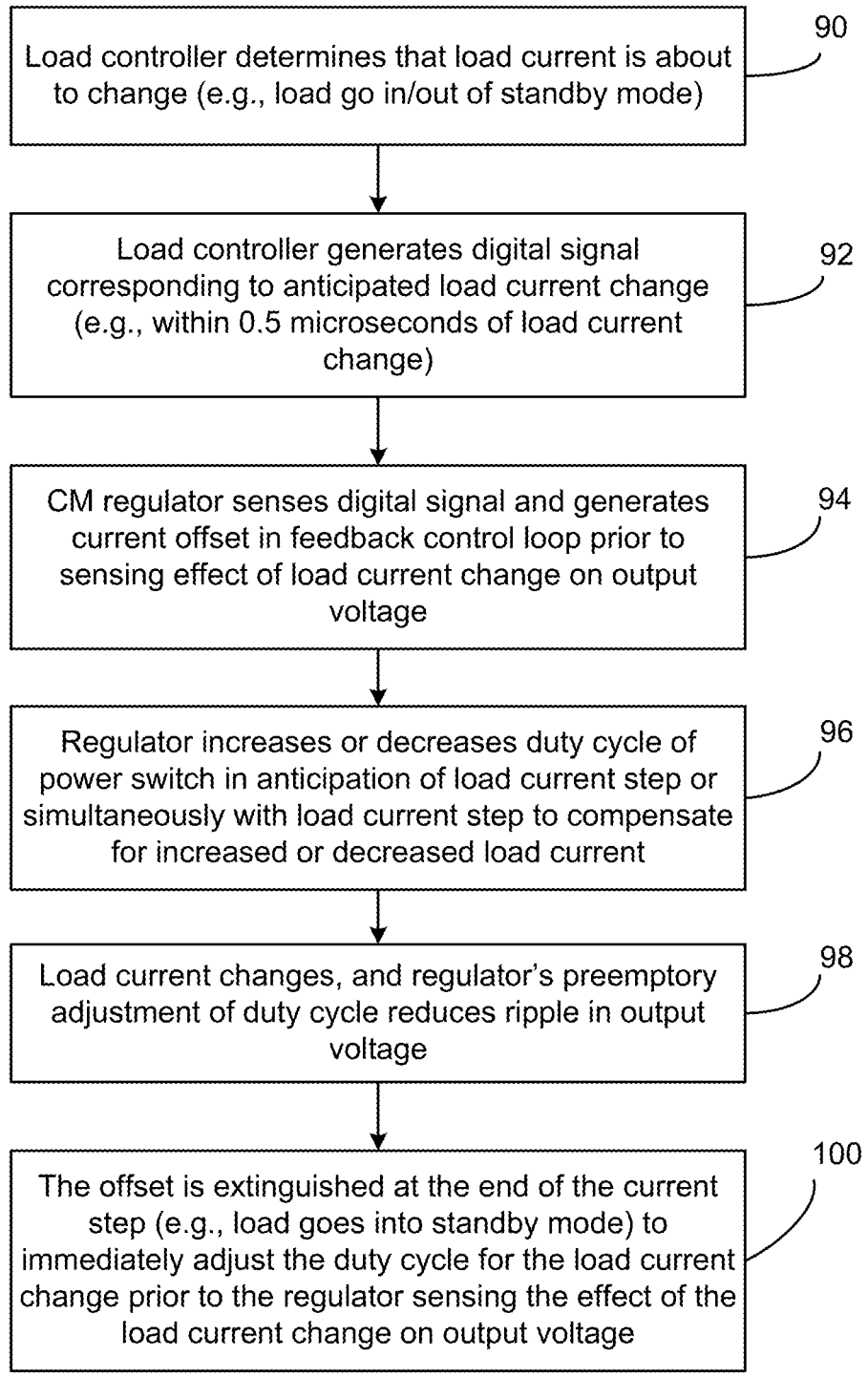
FIG. 3 is a flowchart identifying certain steps employed when carrying out one embodiment of the present invention.

FIG. 3 is a flowchart identifying various steps performed pursuant to the present invention.

In step 90, a load controller, or other suitable circuit that can provide advanced notice of a load current step, determines that the load current is about to change.

In step 92, the load controller generates a digital signal corresponding to the load current change. The digital signal may identify the magnitude and direction of the load current change to any resolution. This digital signal is provided with sufficient time for the offset circuitry to respond just prior to the current step or concurrently with the current step, so that the regulator does not need to wait for a transient in the output voltage to compensate for the current step.

In step 94, the CM regulator senses the digital signal and generates a current offset in a feedback control loop of the regulator. The loop may directly adjust the current comparator offset or may adjust the compensation voltage which, in turn, adjusts the current comparator offset. The offset occurs prior to the sensing of any output voltage transient due to the load current step. The offset may exist for the entire length of the current step or taper off over multiple clock cycles while still reducing the output voltage ripple.

In step 96, in response to the offset, the regulator increases or decreases the duty cycle of the power switch in preparation for the increase or decrease in load current. This correction may take place a fraction of a clock cycle before the current step or one or more clock cycles before the current step, depending on the magnitude of the current step. The magnitude and timing of the offset signal are optimized for the current step and the regulator.

In step 98, the load current changes, and the regulator's preemptory adjustment of the duty cycle of the power switch reduces the ripple in the output voltage caused by the load current step.

In step 100, at the end of the current step (e.g., the load current reduces to a starting level after a positive current step), the offset is extinguished to immediately adjust the duty cycle to account for the lower load current prior to the regulator reacting to any change in the output voltage. The load controller may transmit another digital signal to extinguish the offset. The optimal timing requirements of the offset extinguishing are similar to the timing requirements of the offset being applied. In one embodiment, the digital signals for the offsets are stored in the regulator and the load controller triggers the offset with a timing signal.

After the offset is extinguished and the current comparator returns to the zero offset condition, the summer 68 acts like a short circuit, and the duty cycle reverts back to being based on the output voltage.

Test Results

Figure 4:
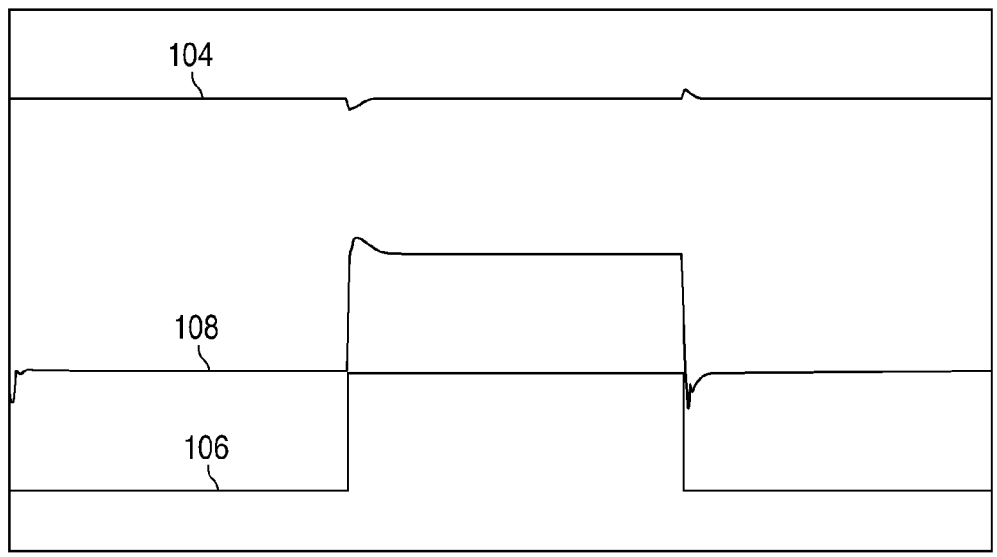
FIGS. 4-12 are graphs from simulations.

FIG. 4 illustrates a transient response of an optimized single-rail current mode loop responding to a 2-15 A current load step. To illustrate the concept, PWM timing uncertainty is ignored for this analysis. The line 104 is VOUT; the line 106 is the load current; and the line 108 is ITH (normally corresponding to a peak current threshold). ITH is representative of the regulator closed loop response to load current, and the ITH pin is shown in FIG. 2. Note the large change in ITH as the output voltage drop is detected, where the ITH signal must rise to increase the duty cycle of the power switch.

Figure 5:

FIG. 5 is a close-up of the output voltage ripple (line 104), with a peak-peak variation of approximately 100 mV due to a large load current transient.

The current load step occurs and the loop begins to respond within the first 2uS PWM clock cycle (assuming a switching frequency of 500 kHz). However, the magnitude of the output voltage transient is a function of the current load step and the loop bandwidth. The loop speed only affects the recovery time. The magnitude of the output voltage transient can only be reduced by increasing the output capacitance and minimizing the ESR/ESL of the output capacitors.

The simulation below shows the same current load step applied to the same power stage; however, an offset current is applied to the current comparator at approximately the same instant the current load step occurs.

Figure 6:
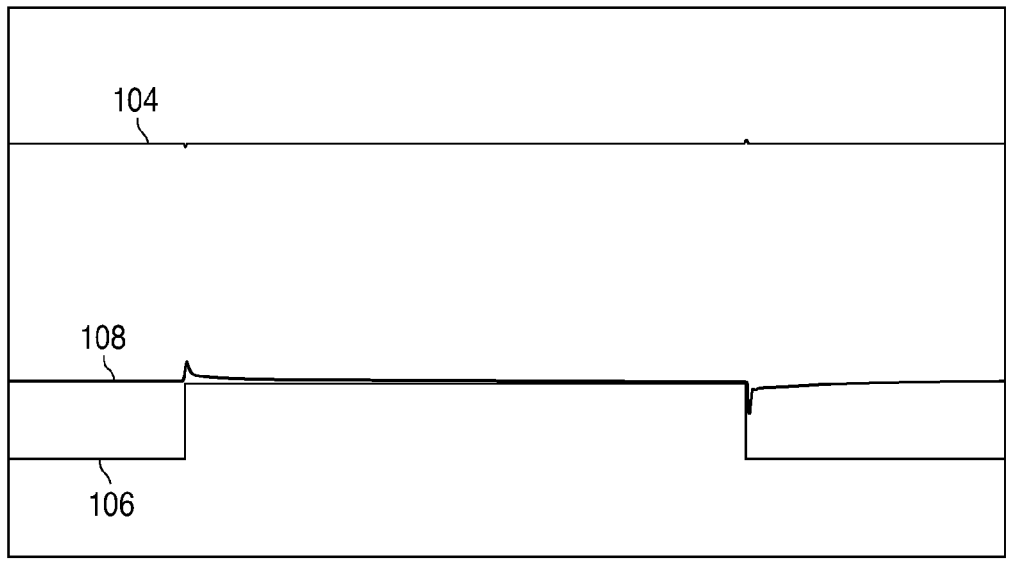

FIG. 6 illustrates a single stage transient response to a load current step with the current feedback signal into the current comparator 82 (FIG. 2) or PWM comparator 50 (FIG. 1) offset to compensate for the current step. In FIG. 6, in contrast to FIG. 4, the ITH line 108 does not move significantly to account for the current load step because the offset has already adjusted the duty cycle for the current step prior to the output voltage drooping.

Figure 7:
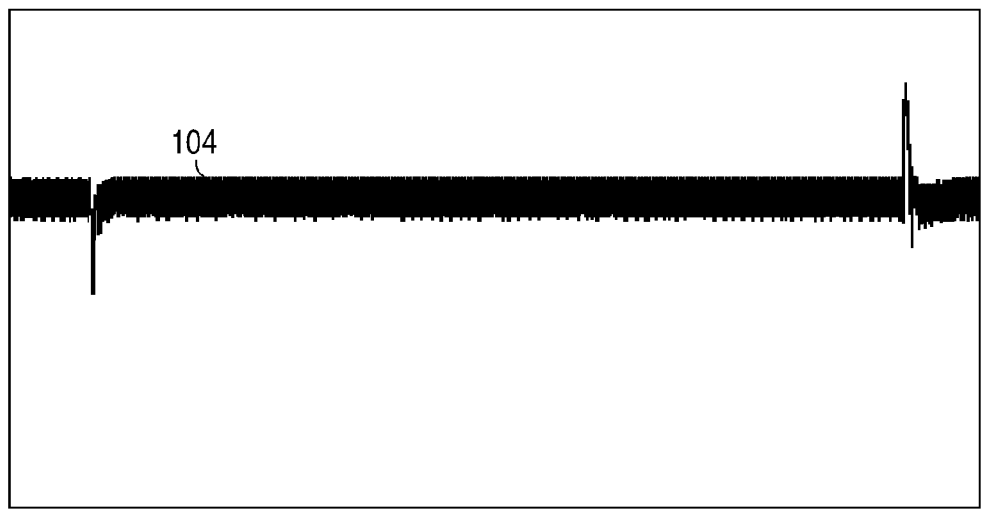

FIG. 7 is a close-up of the output voltage ripple (line 104) in FIG. 6, with a peak variation of approximately 25 mV. Note the greatly reduced output voltage spike (4× reduction), and length of the spike, compared to the spike shown in FIG. 5 without the offset. This 4× reduction in peak-peak voltage ripple is achieved by adjusting the current comparator offset which, in-turn eliminates the need for the voltage loop to respond.

The alignment of the current comparator offset in time to the current load step determines the voltage peak-peak ripple reduction. The worst case scenario for error would be to apply the offset adjustment when no corresponding load transient is present.

Figure 8:
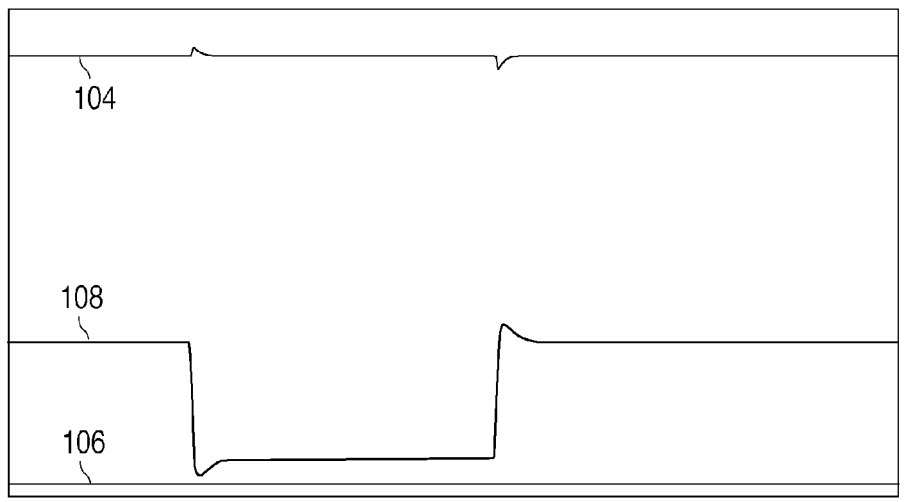

FIG. 8 shows the simulation results of an offset adjustment of the current comparator with no corresponding current load step. Note the load current line 106 is not moving but the loop is responding to a transient as shown by the movement in the ITH line 108. The output voltage ripple (line 104), caused by the regulator reacting to the offset, is the same 100 mV peak-peak magnitude; however, the voltage ripple is inverted from an actual current load step. Because the characteristics of the voltage loop have not been modified, the transient response is the same as if a current load step had occurred. This analysis bounds the error if the timing of the current step is not well synchronized to the load transient. The additional fast adjustment will not cause unstable operation but may result in additional voltage ripple on the output. This highlights the desirability for close alignment of the transient current signal and the corresponding current comparator offset adjustment.

Minimizing Timing Uncertainty

In a single phase application clocked at 500 kHz, there is worst case timing uncertainty of 2uS between when the adjustment signal is received and the current comparator offset effects are processed in the PWM engine. This timing variation is caused by the clocking control of the PWM engine. After the topside transistor gate voltage (TG) has transitioned low, it cannot go high again until the start of the next PWM clock cycle. This timing uncertainty is too large for the current comparator offset adjustment to have a significant impact on the output ripple.

Figure 9:
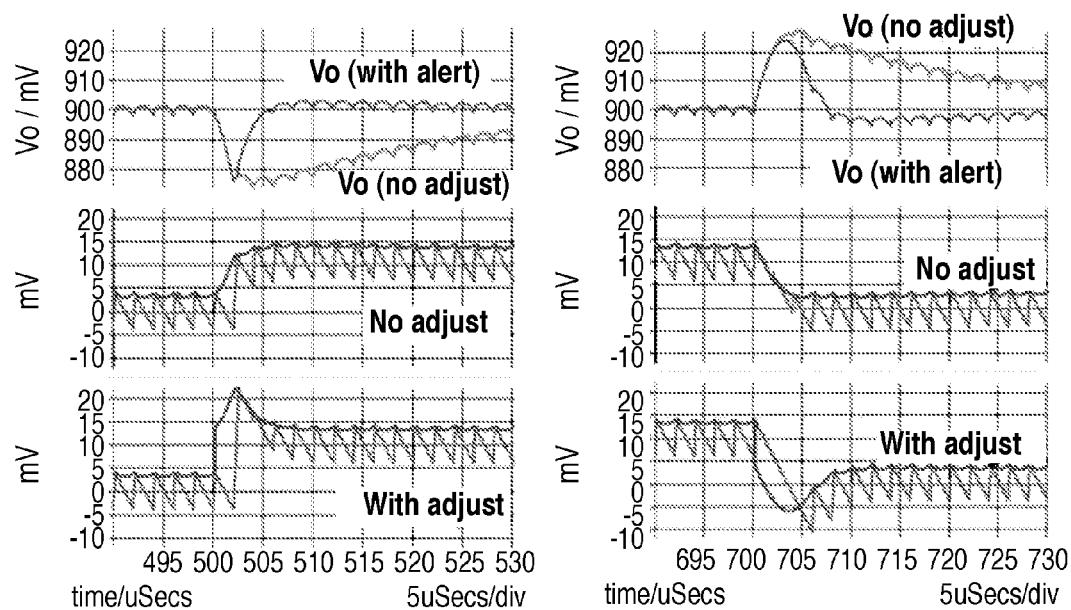

FIG. 9 illustrates the effects of the current comparator offset adjustment with undesirable timing uncertainty, where, for a positive current step, the offset first occurs right after the power switch has turned off during a clock cycle so as to have no immediate effect at the start of the current step (left side of FIG. 9). The right side of FIG. 9 illustrates the effect of the offset being extinguished too long after the negative current step, rather than ideally immediately before or during the current step. FIG. 9 illustrates the output voltage (Vo) ripple with and without the offset adjustment in one scenario. Note how, even with the adjustment signal present, the voltage transient magnitude is not significantly reduced when there is timing uncertainty since the adjustment came too late. To minimize the timing uncertainty, an additional change is made to the PWM controller to allow an extra TG pulse if the offset adjustment signal is received after TG has transitioned low. This re-enablement of the TG pulse minimizes the timing uncertainty of the controller and allows a single rail implementation to improve transient response significantly. This re-enablement of the TG pulse may be accomplished by the decoder 64 of FIGS. 1 and 2 generating a set signal 73 in the event the flip-flop 20 is in a reset state. This effectively adds another current pulse to charge the output capacitor. Of course, if the current step is negative, the flip-flop 20 is not controlled to re-enable the TG pulse since the offset is intended to immediately reduce the duty cycle.

Figure 10:
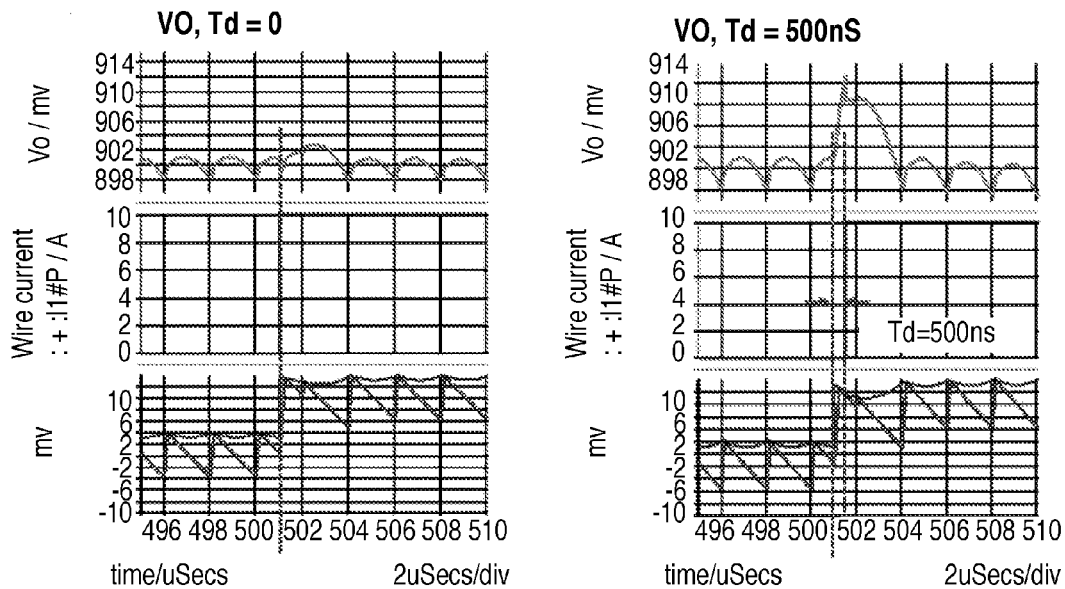

FIG. 10 illustrates the same single rail conditions except the TG pulse is allowed to be reasserted during the PWM cycle if an offset command is received for compensating for an imminent positive current step. Again a 4-5× reduction in output voltage peak-peak noise is achieved, even when the offset adjustment signal is sent 0.5uS after the load step occurs. Therefore, it is possible that the digital signal alerting of the load current step may be transmitted at the time of the current step, if the offset circuitry can respond within about 0.5uS. Note that the graph ranges in FIG. 10 are reduced from those in FIG. 9.

Multi-Phase Application

For many of the applications where a priori knowledge is available and where the rail currents are very large and the change in load can be substantial, a multi-phase implementation is recommended. In a multi-phase implementation, multiple regulators are clocked at the same frequency but set to clock at different phase delays to supply equal currents to the load at the optimal time. The simulations illustrated in FIGS. 11 and 12 were run with a 4-phase circuit clocking at 500 kHz per phase. A current load step of 40 A in 1uS steps was applied, where each phased regulator supplied a current step of 10 A.

Figure 11:
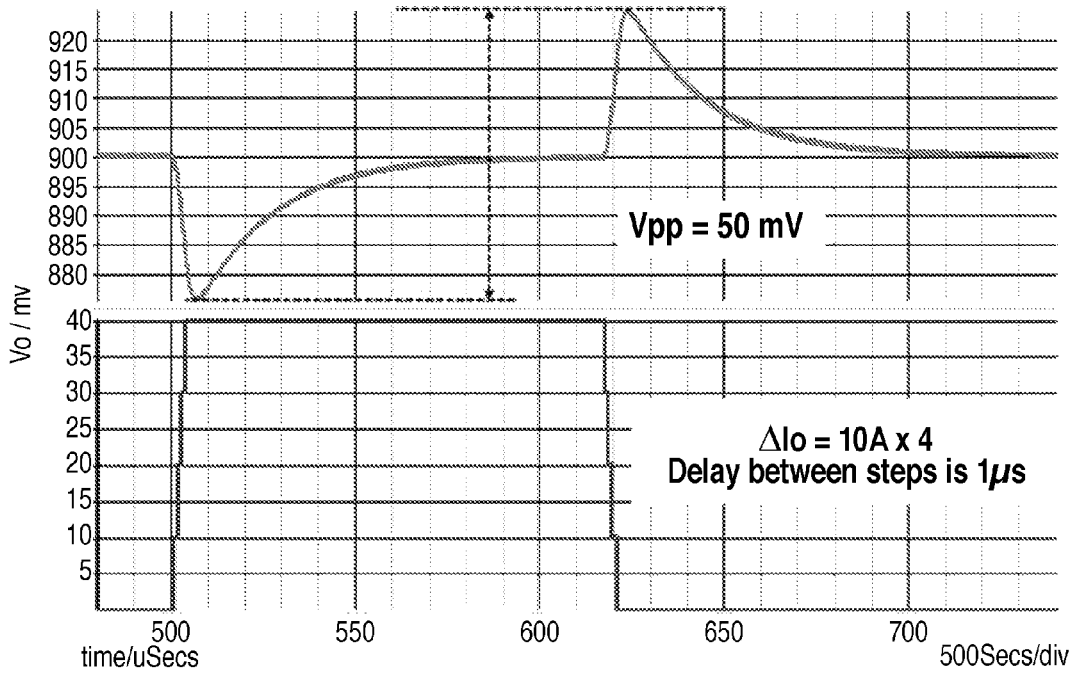

FIG. 11 illustrates a 4-phase transient response to a load current step, assuming a conventional prior art regulator, where a load current step of 40 A was applied in 10 A increments with a delay between each step of 1 uS. The large output voltage ripple due to the load current step is shown in FIG. 11.

Figure 12:
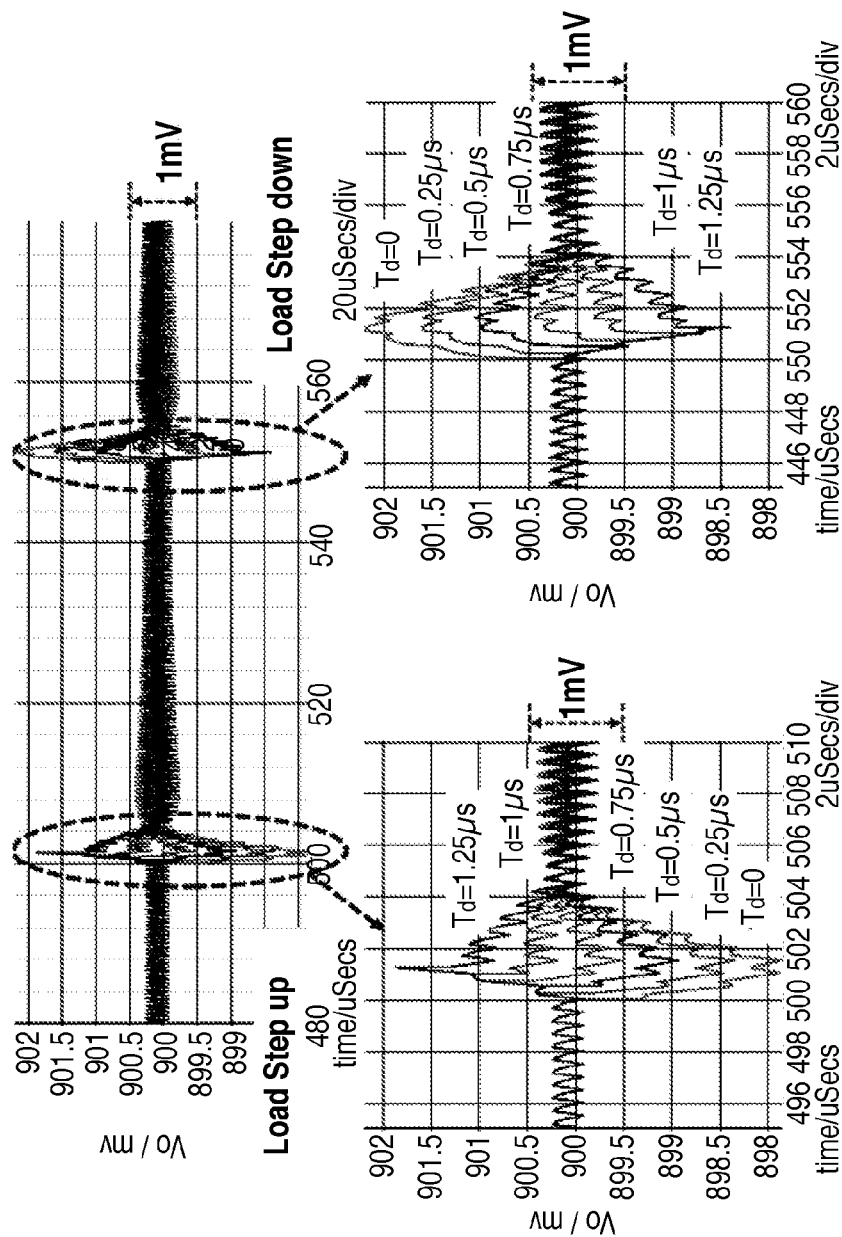

FIG. 12 shows the transient response of a 4-phase current mode regulator responding to a 40 A load current step with variable time delays between the load transient and the current comparator offset adjustment. The peak-peak output voltage ripple is shown to be reduced from 50 mV (FIG. 11) to under 2 mV for all conditions. The circuit in FIG. 12 uses all ceramic capacitors in the output. Under the same conditions, and using an output stage composed of POS capacitors and ceramic capacitors, a reduction in voltage ripple of more than a factor of 5 was achieved. POS capacitors have approximately 5 mOhm ESR versus the near 0 ESR of the ceramic capacitors. The extra ESR causes larger voltage transients for a given load current step. These simulations indicate that, if the timing of the adjustment signal is within 1.25uS of the current load transient, a significant reduction in output ripple can be achieved with typical switching frequencies of the power stage. As shown, a timing delay of 0.75 uS was the optimal delay to cause the adjustment of the power switch peak current to coincide with the current step. If the delay is too great, the adjustment will not occur in time for the current step (Vout spikes down) and, if the delay is too short, the offset itself will cause the output voltage ripple (Vout spikes up).

Using Current Loop Offset to Rapidly Change Regulated Output Voltage

This general technique may also be applied to responding to an external command signal for changing the output voltage of a current mode regulator, such as the regulator in FIGS. 1 and 2.

Figure 13:
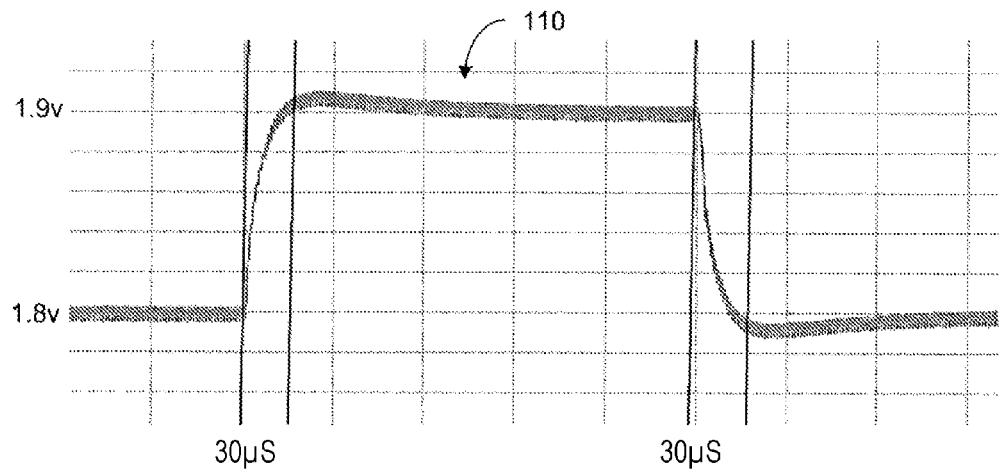
FIG. 13 illustrates the output voltage of a prior art regulator when responding to an external command signal to increase the output voltage from 1.8 volts to 1.9 volts, then back down to 1.8 volts.

FIG. 13 illustrates the response to a command signal for stepping the output voltage in a prior art regulator between 1.8 volts and 1.9 volts. Any other voltage step may also occur. In such a prior art regulator, only the reference voltage or feedback voltage in the slow voltage loop is modified. Changing the reference voltage is typically simpler. FIGS. 1 and 2 show a control signal for a voltage step applied to the reference voltage generator 109 to change the Vref applied the error amplifier 44. Since the regulator adjusts the duty cycle of the power switch to cause the feedback voltage to match the new reference voltage Vref, a wide range of output voltages can be achieved. The voltage loop is slow to react to the "error" signal output from the error amplifier because of the compensation capacitor 46 and the output capacitor 36. A minimum capacitance is required to provide sufficient phase margin to avoid oscillations.

FIG. 13 illustrates a delay of 30 µS between the time that the reference voltage is modified to the time that the regulator achieves the final output voltage of 1.9 volts. Many switching cycles are needed due to the relatively slow response of the voltage feedback loop. The same delay is incurred when the feedback voltage is modified to reduce the output voltage from 1.9 volts to 1.8 volts. Obviously, the delay is much greater for larger voltage steps.

Figure 14:
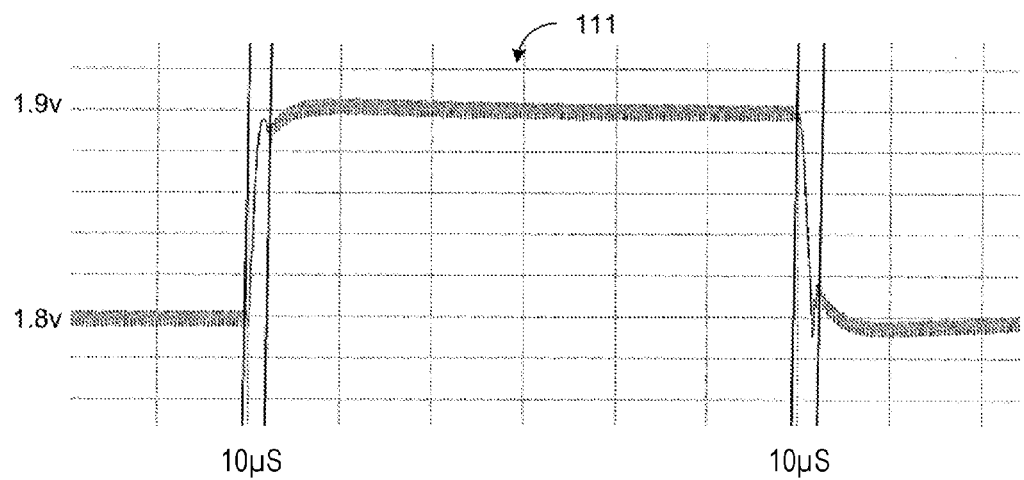
FIG. 14 illustrates the output voltage of a regulator, in accordance with the present invention, when responding to an external command signal to increase the output voltage from 1.8 volts to 1.9 volts, then back down to 1.8 volts.
Figure 15:
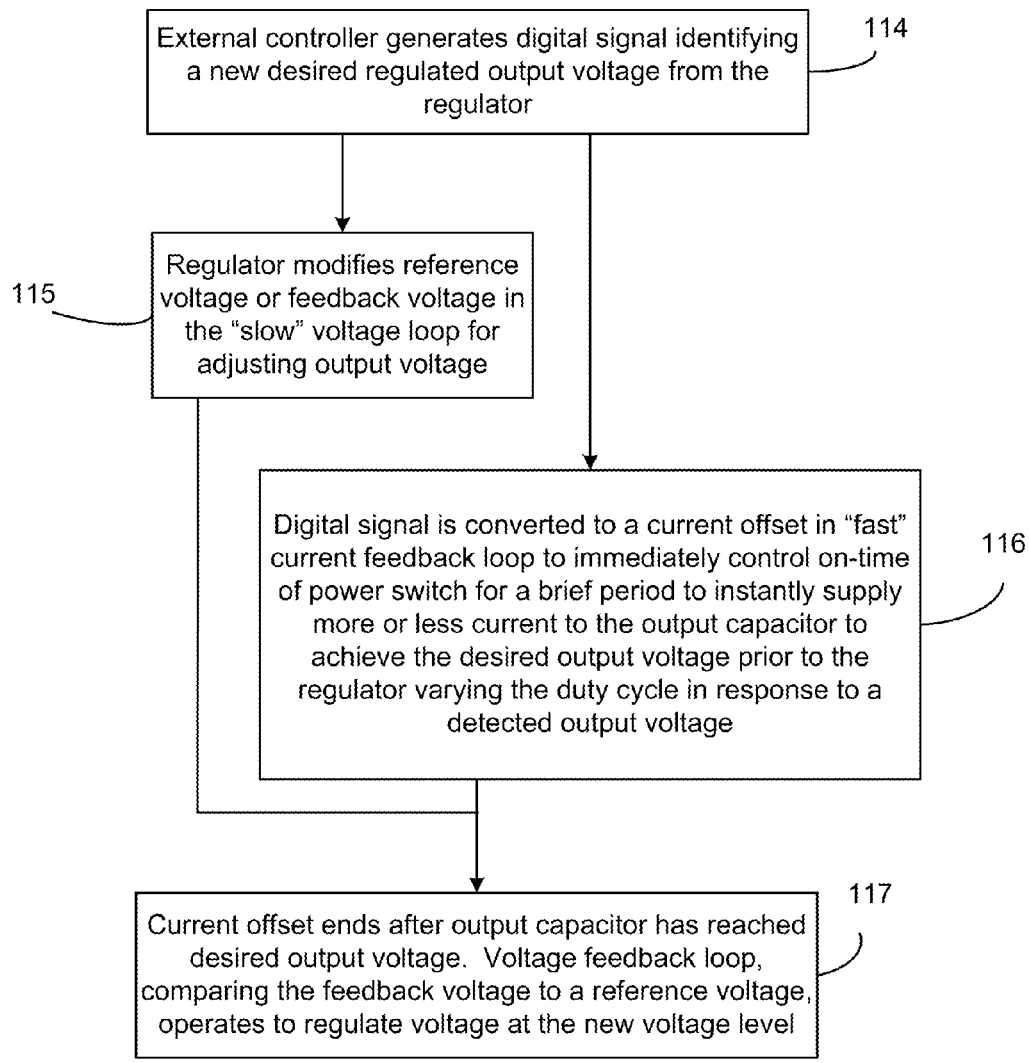
FIG. 15 is a flowchart identifying various steps for carrying out the invention for responding to a command to change the output voltage.

FIGS. 14 and 15 illustrate the improvement made to achieve a faster response to an external command signal identifying a new output voltage to be generated by the regulator.

In step 114 of FIG. 15, an external controller, such as one controlling the load or multiple loads, generates a digital signal identifying a new desired regulated output voltage from the regulator. The digital signal may instead just identify the voltage step rather than the absolute voltage.

In step 115, in response to the digital signal, the regulator decodes the signal and modifies the reference voltage or feedback voltage in the slow voltage loop for regulating the output voltage. The feedback voltage may be modified by changing the resistance ratio in a resistor divider connected between the output voltage and the error amplifier. The resistance may be changed by switching in or out resistors in parallel.

In step 116, along with changing the reference voltage or feedback voltage, the digital signal is converted by a decoder 64 (FIG. 1), a DAC 66, and a summer 68 to an analog current offset in the fast current feedback loop to immediately control the on-time of the power switch 28 for a brief period to instantly supply more or less current to the output capacitor 36 to quickly achieve the target output voltage prior to the time that the voltage loop would have achieved the target voltage in response to the feedback voltage not matching the reference voltage. Since the desired output voltage step is dependent on the output capacitance, the current applied to the capacitor, and the duration of the current, the required offset (which controls the power switch on-time) can be easily stored in a look up table in the decoder 64 and addressed by the digital signal identifying the new desired output voltage. Accordingly, the current offset quickly steps the output voltage to the target voltage well prior to the time that the voltage loop would have achieved the target voltage in response to the feedback voltage not matching the reference voltage.

In step 117, after the target output voltage is achieved by the current offset, the current offset ends and the voltage loop operates in a conventional manner to control the duty cycle to match the feedback voltage to a reference voltage to cause the regulator to continue to output the target output voltage.

FIG. 14 shows the reduced delay by using the technique of FIG. 15. The graph 111 is a simulation of the output voltage of a regulator, using the technique of FIG. 15, showing that the delay between receiving the digital signal commanding a 0.1 voltage step, and the time the regulator outputs the target voltage (1.9 volts) is about 10 µS, rather than the prior art 30 µS delay without the use of the current offset. Thus, a 3× improvement in the voltage transient response has been achieved using this technique.

Fast Serial Peripheral Interface (SPI) Receiver

This section describes a fast SPI receiver, shown in FIG. 15, used to adjust the current comparator offset in accordance with one embodiment of the invention. The receiver may be added to, for example, the LTC38xx current mode controller family. The full data sheet for the LTC3873 DC/DC Controller, available from the Linear Technology Corporation (LTC) website, is incorporated herein by reference. The invention will improve the positive and negative transient response of any current mode power supply to current load steps provided some or all of the following criteria are met:

1. The magnitude of the load step, both positive and negative, is well defined.
2. The user (e.g., a load controller circuit) can send a timely signal, such as 1uS-0.5uS prior to the load transient.
3. The user can determine the magnitude of the offset to be used by the regulator controller chip based on power stage calculations.
   a. The offset may be calculated using an LTC design tool that takes into account the characteristics of the regulator.
   b. The tool will adjust for the number of phases needed for the current compensation by the regulator.
   c. The LTC38xx will not have to make any calculations, avoiding additional system latency.

If the offset is provided within 500 ns of the current load step, the invention can reduce the voltage peak-peak ripple induced as a response to a current load by more than a factor of 4.

The fast SPI receiver also adjusts the current comparator offset in response to an external command signal to step the regulated output voltage up or down. As discussed above, the digital command signal identifies the new target voltage, and the reference voltage or feedback voltage is modified in the voltage feedback loop (as is conventional) as well as a current offset is briefly applied in the fast current loop to instantly provide more or less current to the output capacitor to quickly achieve the target output voltage prior to the time that the slower voltage loop would have achieved the target output voltage by responding to the feedback voltage not matching the reference voltage.

The SPI receiver provides a simple interface that uses a clock signal (CLK_SPI), data signal (SPI_DI), and a chip select (for multi-phase applications) and output latching clock signal CSB_SPI. The protocol is a single 8-bit or 16-bit serial data stream that contains a mode bit (load current step or output voltage step), 2 channel address bits, and data bits. If the current step mode is selected, the data stream is 8-bit serial data and contains 5 bits of data for the offset.

If the voltage step mode is selected, the data stream is extended to 16-bits and contains 13-16 bits of VREF data for higher resolution and wider dynamic range.

FIG. 16 illustrates the data stream and clock signals for the current step mode.

The clock rate of input CLK_SPI is up to 20 MHz and the data is received in MSB first fashion. An edge sensitive output register 120 placed between the SPI serial shift register 122 and the offset input eliminates multiple offset transitions when receiving a new offset setting. This register 120 is clocked with the rising edge of SPI_CSB to allow the shift register 122 to be loaded at an arbitrary time in advance of an offset setting change, minimizing timing uncertainty of the commanded value.

Address bits A1 and A0 are used to route data bits D4 thru D0 to the proper offset circuit. Data can be sent to CH0 V/I, or CH1 V/I, or both channels, in the example. FIG. 17 defines the digital bits in one embodiment of the current step mode.

Timing Analysis

For the current step mode, using $t_{PER}(max)$, the total latency from start of serial transmission until the 5 bit offset code is received is nominally 8*50 nS+20 nS (CSB_SPI min. hold time)+(approximately 10 nS offset propagation time)=approximately 430 nS. If desired, the rising edge of CSB_SPI may be delayed beyond the minimum hold time thus further decoupling the serial data transfer process from the actual offset update.

Although the offset technique described herein is particularly suited to peak current control CM regulators, the offset technique can be applied to any regulator where the duty cycle of a power switch can be adjusted by applying an offset at the input of a PWM comparator. For example, in one type of regulator, a control voltage is compared to a sawtooth oscillator signal, and the crossing causes the power switch to be turned off. A clock turns the power switch back on at the beginning of the next clock cycle. By providing an offset at either input of the PWM comparator around the time of a current or voltage step, the duty cycle can be immediately controlled to prior to the regulator reacting to any change in the output voltage.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A current mode switching regulator circuit comprising:
   a power switch controller for generating control signals for controlling a duty cycle of a power switch for generating a regulated voltage to a load, the power switch controller comprising:
      a voltage feedback loop, sensing at least an output voltage of the regulator circuit, for providing feedback signals to the power switch controller for maintaining a regulated output voltage of the regulator circuit;
      a current sense circuit configured to generate a current sense signal corresponding to a current through the power switch; and
      a current feedback loop that compares the current sense signal to a threshold value to turn off the power switch at a peak current for controlling the duty cycle of the power switch;
   a first circuit that generates a first signal prior to and in anticipation of a first load current step;
      the power switch controller further comprising an offset circuit connected in the current feedback loop that, in response to the first signal, generates an offset signal that offsets the current sense signal by an amount corresponding to the anticipated first load current step to adjust the duty cycle of the power switch for the first load current step without sensing the output voltage of the regulator,
   wherein, after the first load current step has occurred and the offset signal has adjusted the current sense signal, the regulator circuit regulates the output voltage based on a feedback voltage in the voltage feedback loop corresponding to the output voltage of the regulator circuit.

2. The circuit of claim 1 wherein the offset circuit, in response to the first signal, adjusts the duty cycle of the power switch for the first load current step prior to the regulator circuit responding to a change in the output voltage due to the first load current step.

3. The circuit of claim 2 wherein the first circuit generates the first signal within 0.5 microseconds of the first load current step.

4. The circuit of claim 2 wherein the power switch is switched at a certain clock frequency by the power switch controller, and wherein the first signal is received by the regulator circuit within one clock period preceding the first load current step.

5. The circuit of claim 2 further comprising:
   a latch as part of the power switch controller, the latch being configured for turning on the power switch upon receiving a set signal at a set terminal of the latch, wherein the set signal is generated upon receiving the first signal when the first signal indicates the anticipated first load current step or commands a positive output voltage step, and wherein the set signal is also generated by a clock at a beginning of each power switching cycle, the latch also having a reset terminal, the latch being configured for turning the power switch off upon receiving a reset signal at the reset terminal; and
   a comparator for controlling pulse width modulation of the power switch, the comparator having an output that generates the reset signal, but not the set signal, so that the comparator can only control the power switch to turn off but not turn on.

6. The circuit of claim 1 wherein the offset circuit generates an analog first offset signal and offsets a feedback signal in the current feedback loop by the first offset signal.

7. The circuit of claim 1 wherein the offset signal is a first offset signal, wherein the offset circuit generates the first offset signal as long as the first load current step continues.

8. The circuit of claim 7 wherein the offset circuit, in response to a second signal alerting of a second load current step, generates a second offset signal, different from the first offset signal, to adjust the duty cycle of the power switch for the second load current step prior to the regulator circuit responding to a change in the output voltage due to the second load current step.

9. The circuit of claim 1 wherein the first signal has a magnitude related to a magnitude of the first load current step.

10. The circuit of claim 9 wherein the first signal is digital.

11. The circuit of claim 10 further comprising a digital decoder connected to receive the first signal, and further comprising a digital to analog converter (DAC) for converting an output of the decoder to the offset signal for offsetting a feedback signal in the current feedback loop.

12. The circuit of claim 11 wherein the decoder scales the offset signal.

13. The circuit of claim 1 wherein the first signal is generated by a load controller.

14. A method performed by a current mode switching regulator circuit comprising:
   generating control signals by a power switch controller for controlling a duty cycle of a power switch for generating a regulated voltage to a load;
   sensing, by a voltage feedback loop, at least an output voltage of the regulator circuit, for providing feedback signals to the power switch controller for maintaining a regulated output voltage of the regulator circuit;
   generating, by a current sense circuit, a current sense signal corresponding to a current through the power switch;

comparing, by a current feedback loop, the current sense signal to a threshold value to turn off the power switch at a peak current for controlling the duty cycle of the power switch;

receiving a first signal, prior to and in anticipation of a first load current step; and in response to the first signal, generating, by an offset circuit connected in the current feedback loop, an offset signal that offsets the current sense signal by an amount corresponding to the anticipated first load current step to adjust the duty cycle of the power switch for the first load current step without sensing the output voltage of the regulator, wherein, after the first load current step has occurred and the offset signal has adjusted the current sense signal, the regulator circuit regulates the output voltage based on a feedback voltage in the voltage feedback loop corresponding to the output voltage of the regulator circuit.

15. The method of claim 14 wherein the power switch controller comprises a latch, the latch turning on the power switch upon receiving a set signal at a set terminal of the latch, wherein the set signal is generated upon receiving the first signal when the first signal indicates the anticipated first load current step or commands a positive output voltage step, and wherein the set signal is also generated by a clock at a beginning of each power switching cycle, wherein the latch also has a reset terminal, the latch turning the power switch off upon receiving a reset signal at the reset terminal; and wherein the power switch controller further comprises a comparator for controlling a pulse width modulation of the power switch, the comparator having an output generating the reset signal, but not the set signal, so that the comparator can only control the power switch to turn off but not turn on.

16. The method of claim 15 wherein the first signal is generated within 0.5 microseconds of the first load current step.

17. The method of claim 15 wherein the first signal has a magnitude related to a magnitude of the first load current step.

18. The method of claim 15 wherein the first signal is digital, the regulator circuit further performing the method of:

digitally decoding the first signal, by a decoder, to scale the first signal; and converting a digital output of the decoder to the offset signal for offsetting the current sense signal in the current feedback loop by the offset signal.

19. The method of claim 15 wherein the offset circuit, in response to the first signal, adjusts the duty cycle of the power switch for the first load current step prior to the regulator circuit responding to a change in the output voltage due to the first load current step.

* * * * *